(12) United States Patent
Ashida et al.

(10) Patent No.: US 8,739,303 B2
(45) Date of Patent: *May 27, 2014

(54) EMBEDDED DEVICE AND STATE DISPLAY CONTROL

(75) Inventors: Takashi Ashida, Yamato (JP); Kenichi Satoh, Yamato (JP); Hiroyuki Tanaka, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,124

(22) Filed: May 4, 2012

(65) Prior Publication Data
US 2012/0216295 A1    Aug. 23, 2012

Related U.S. Application Data

(63) Continuation of application No. 12/788,234, filed on May 26, 2010.

(30) Foreign Application Priority Data

Jun. 25, 2009   (JP) ................................. 2009-150823

(51) Int. Cl.
*G06F 7/04*       (2006.01)
*G06F 12/00*      (2006.01)
*H04N 7/16*       (2011.01)

(52) U.S. Cl.
USPC ................... 726/27; 726/17; 726/21; 726/30; 715/234; 715/700

(58) Field of Classification Search
USPC .................. 715/234, 700; 726/17, 21, 27, 30
See application file for complete search history.

(56) References Cited

U.S. PATENT DOCUMENTS

| 7,058,886 | B1 | 6/2006 | Sulistio et al. | |
|---|---|---|---|---|
| 7,685,260 | B2 * | 3/2010 | Fukuda et al. | 709/219 |
| 8,156,146 | B2 * | 4/2012 | Arthursson | 707/783 |
| 8,176,563 | B2 * | 5/2012 | Redlich et al. | 726/27 |
| 8,316,358 | B2 * | 11/2012 | Chen et al. | 717/143 |
| 8,375,086 | B2 | 2/2013 | Flavin | |
| 2002/0184264 | A1 | 12/2002 | Berg et al. | |
| 2002/0194388 | A1 * | 12/2002 | Boloker et al. | 709/310 |
| 2009/0225981 | A1 * | 9/2009 | Motohashi | 380/28 |
| 2010/0262589 | A1 * | 10/2010 | Gnech et al. | 707/695 |
| 2011/0096361 | A1 * | 4/2011 | Aoki et al. | 358/1.15 |

* cited by examiner

*Primary Examiner* — Jeffrey Pwu
*Assistant Examiner* — Jayesh Jhaveri
(74) *Attorney, Agent, or Firm* — Griffiths & Seaton PLLC

(57) ABSTRACT

A browser is requested to display a text file having a description of a screen structure. The state information on a current state of the embedded device is acquired. An access request for requesting the browser to update, with the acquired state information, a value of at least one node in a document object model (DOM) tree generated from the text file by the browser, is submitted by a state display control program. The at least one node is recorded in an access history list. At a subsequent time, it is determined whether to permit a subsequent access request. If the source of the subsequent access request is not the state display control program, and the at least one node is recorded in the access history list, the subsequent access request is denied.

10 Claims, 14 Drawing Sheets

| OBJECT IDENTIFIER | EVENT | CALLBACK ADDRESS |
|---|---|---|
| ID-A | onLoad | xxxxxxxa |
| ID-B | onClick | xxxxxxxb |
| ID-C | onFocus | xxxxxxxc |
| ... | ... | ... |

FIG. 3

| OBJECT IDENTIFIER | action |
|---|---|
| ID-P | read |
| ID-E | update |
| ID-A | read |
| ... | ... |

EMBEDDED DEVICE AND STATE DISPLAY CONTROL

CROSS-REFERENCE TO RELATED APPLICATIONS

This application is a Continuation of U.S. patent application Ser. No. 12/788,234 filed on May 26, 2010, which claims priority to Japanese Patent Application No. 2009-150823, filed Jun. 25, 2009 and entitled "Embedded Device and State Display Control Method therein."

BACKGROUND OF THE INVENTION

Field of the Invention

The present invention relates in general to computers, and more particularly to an embedded device that uses a browser to display a state of the device and to set various settings in the device.

SUMMARY OF THE DESCRIBED EMBODIMENTS

In a method such as the conventional techniques described previously, in which whether to permit or to prohibit access made by the script processing means is checked with a user previously or every time an instruction is given, complex processing is required. Additionally, unauthorized access cannot be perfectly prevented by the method where judgment as to whether to permit or to prohibit the access is left to a user. The same applies to a case where access rights are set for each object constituting a device object model and the script processing means are given the same rights as an execution user operating a web browser.

Note that unauthorized access can be perfectly prevented by employing a configuration where, when any script processing means make requests for access to information and an operation of an embedded device, such requests and instructions are monitored and totally rejected. In this case, however, the requests and instructions made by all the script processing means are to be rejected regardless of whether each of the script processing means is malicious or not. As a result, convenience is lost.

Consequently, a need exists for a mechanism for safely displaying a state of an embedded device and setting various settings in the device by using a browser without causing loss of convenience. Accordingly, various embodiments for embedded device and state display control are provided. In one embodiment, by way of example only, the browser is requested to display a text file having a description of a screen structure in response to a request to display state information. The state information on a current state of the embedded device is acquired in response to reading the text file by the browser. An access request for requesting the browser to update, with the acquired state information, a value of at least one node in a document object model (DOM) tree generated from the text file by the browser, is submitted by a state display control program. The text file is displayed on a screen of the embedded device in response to the request to display state information. The at least one node is recorded in an access history list in response to the request to update the value of the at least one node. At a subsequent time, it is determined whether to permit a subsequent access request to the at least one node based on a source of the subsequent access request. If the source of the subsequent access request is not the state display control program, and the at least one node is recorded in the access history list, the subsequent access request is denied.

In addition to the foregoing exemplary embodiment, various other apparatus, computer program product, and method of manufacture embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 3 shows one example of an event management table retained in an event management interface section 250 according to this embodiment;

FIG. 4 shows one example of an access history list managed by a history management section 260 according to this embodiment;

DETAILED DESCRIPTION OF THE DRAWINGS

Although the present invention will be described below on the basis of an embodiment of the invention, the following embodiment shall not limit an invention according to the scope of claims, and not all of combinations of characteristics described in the embodiment are necessarily essential for solving means of the invention. Additionally, although the present invention can be applied to various embedded devices such as office equipment such as copy machines and facsimiles, information equipment such as mobile phones and PDAs (personal digital assistants), tablet and other hand-held computing and display devices, and digital home appliances, a multifunction printer will be taken as an example in this description.

Figure 1:
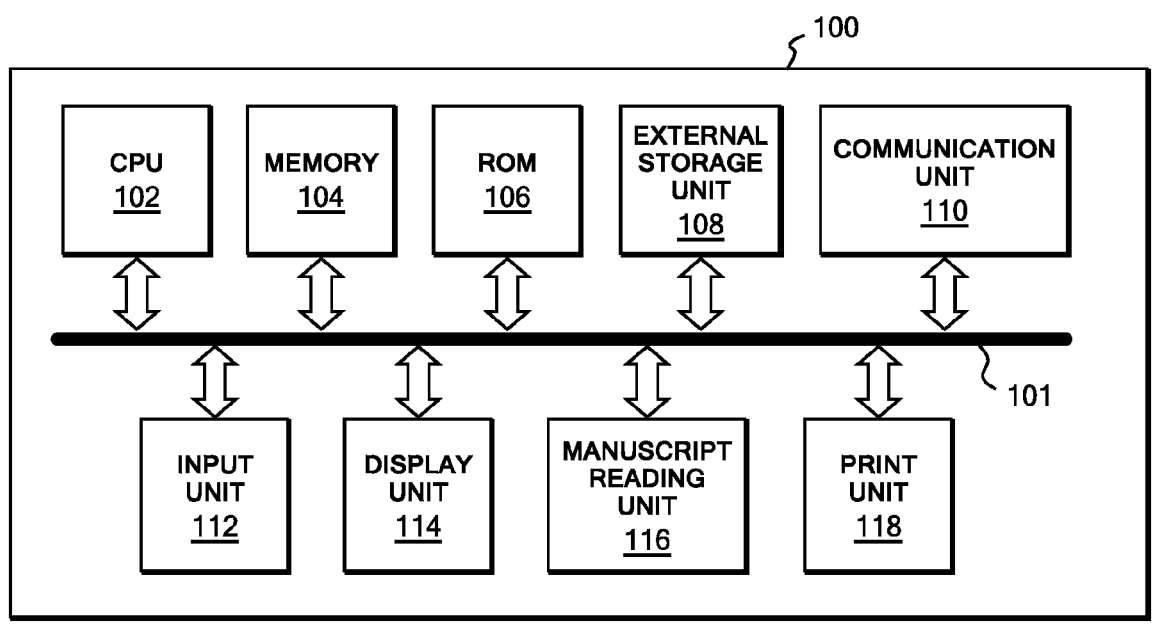
FIG. 1 shows one example of a hardware configuration of a multifunction printer according to an embodiment of the present invention.

FIG. 1 shows one example of a hardware configuration of a multifunction printer 100 according to an embodiment of the present invention. The multifunction printer 100 includes a CPU 102 that controls an entirety of the multifunction printer 100, a memory 104 that functions as a work area of various control programs, a ROM 106 and an external storage unit 108 that store therein various control programs based on which the CPU 102 operates, a communication unit 110 that performs data communication, an input unit 112 used for operation such as setting of various items necessary at the time of printout or scanning, a display unit 114 that displays necessary information in conjunction with the input unit 112, a manuscript reading unit 116 that reads a manuscript, and a print unit 118 used for printing print data on transfer paper. The multifunction printer 100 may be configured to further include a facsimile function (not illustrated).

The CPU 102 is a central control unit that controls an entirety of the printer in accordance with the various control programs stored in the ROM 106 and the external storage unit 108. To this CPU 102, the memory 104, the ROM 106, the external storage unit 108, the communication unit 110, the input unit 112, the display unit 114, the manuscript reading unit 116 and the print unit 118 are connected via a bus 101. Thereby, the CPU 102 controls data communication, manuscript reading operation, printing operation and the like.

The ROM 106 and the external storage unit 108 store therein various control programs used for causing the CPU 102 to operate, and various data used in processing performed by the CPU 102. The various control programs includes a browser and a state display control program according to the embodiment of the present invention. Additionally, the various data includes: at least one settings-screen text file in which a screen configuration for checking or changing later-described setting contents is written; at least one error-notification-screen text files in which a screen configuration for displaying a content of an error is written; and at least one status-display-screen text file in which a screen configuration for displaying a state of processing is written. Specified control programs are loaded into the memory 104. The memory 104 is provided with a work memory used by a control program currently in execution.

The communication unit 110 is provided to perform data communication with the outside, for example, to perform data communication with a computer such as a server connected via a network. The input unit 112 includes a pointing device such as a mouse and a stylus pen, and may further include a digitizer and a tablet. In one embodiment, the display unit 114 is formed of a touch screen. The manuscript reading unit 116 includes an image scanner, and converts image data read by the image scanner into digital data.

The print unit 118 includes a unit that prints print data on a medium such as transfer paper; and a unit that performs image processing for implementing functions set by a user, that is, image processing including processing with respect to image quality aspects such as a scaling factor and a density.

Figure 2:
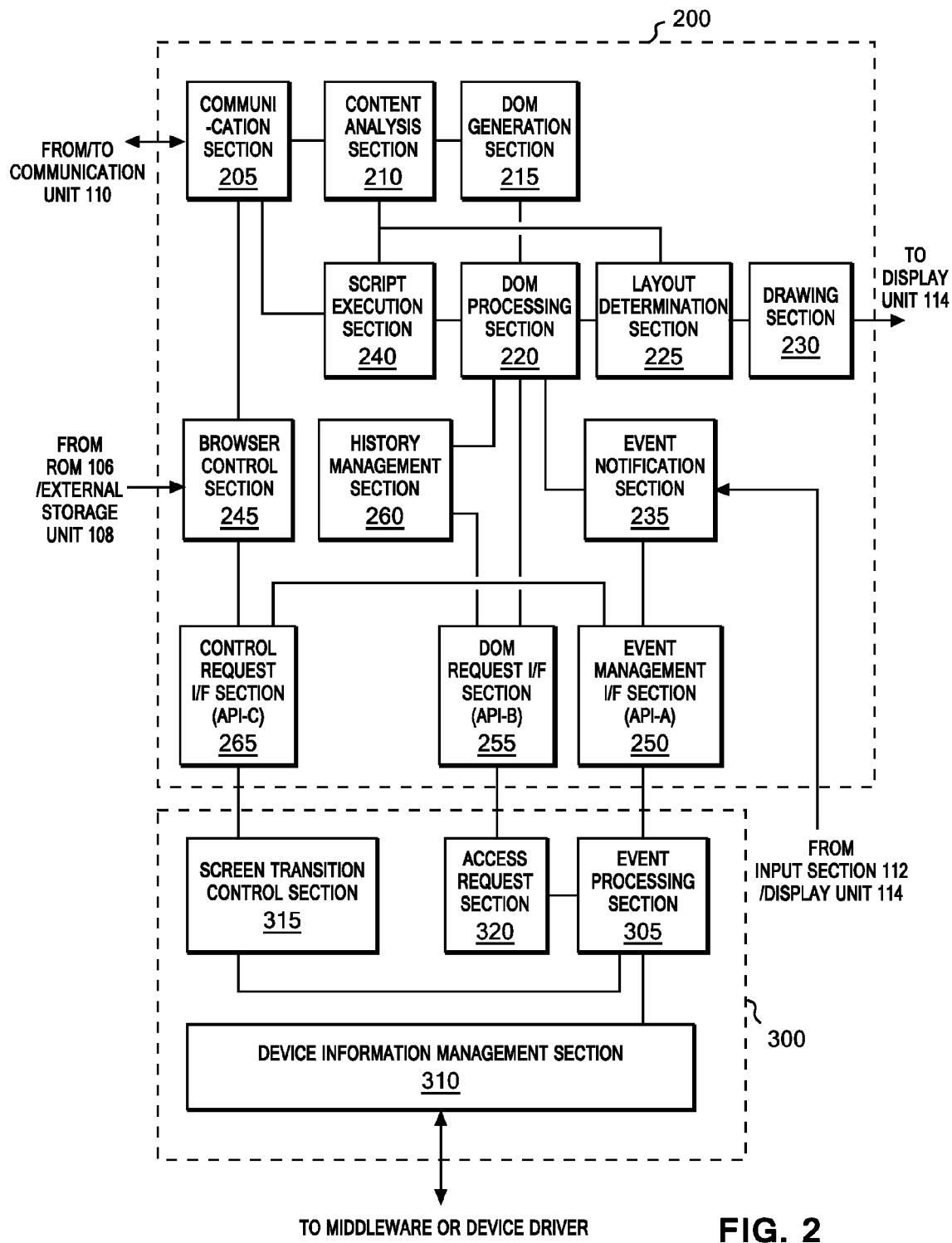
FIG. 2 shows functional configuration of a web browser and a state display control program according to this embodiment.
Figure 5:
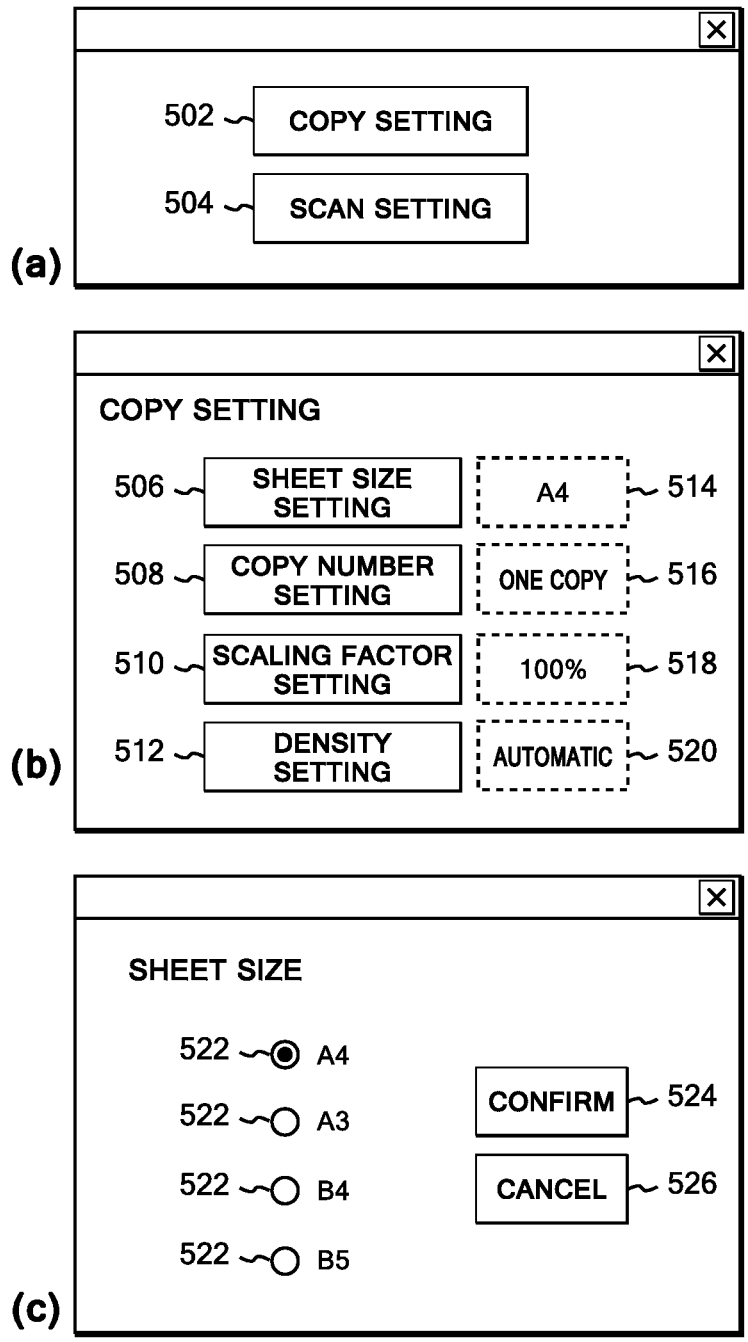
FIG. 5A shows one example of a main screen of an operation panel of the multifunction printer 100 according to this embodiment.
FIG. 5B shows one example of a sub screen that is provided for copy setting and to which the main screen shown in FIG. 5A transitions.
FIG. 5C shows one example of a sub screen that is provided for sheet size setting and to which the sub screen shown in FIG. 5B transitions.

FIG. 2 shows a functional configuration of a browser 200 and a state display control program 300 according to this embodiment. Firstly, the browser 200 according to this embodiment will be described. As in the cases of browsers in general, the browser 200 according to this embodiment is configured for reading in a structured text file expressed in Hyper Text Markup Language (HTML), Extensible Markup Language (XML) or the like, analyzing a layout, and displaying or reproducing text data, image data and audio data contained in the structured text file. Additionally, software written in a language such as JavaScript® or Java® is operable on the browser 200.

The browser 200 according to this embodiment includes a communication section 205, a content analysis section 210 a DOM generation section 215, a layout determination section 225, a drawing section 230, an event notification section 235, a script execution section 240 and a browser control section 245.

Additionally, the browser 200 according to this embodiment newly includes three interfaces so that the later-described state display control program 300 can directly control the browser 200 and contents displayed by the browser 200. The three interfaces are an event management interface section 250, a DOM request interface section 255, and a control request interface section 265.

Furthermore, the browser 200 according to this embodiment includes a DOM processing section 220 and a history management section 260, so that the above direct control of the browser 200 and contents can be safely performed by the state display control program 300 without accompanying security problems.

The communication section 205 establishes and executes communication with another computer, such as a web server, on a network in compliance with the TCP/IP protocol. The communication section 205 is communication means provided for issuing an HTTP request about a resource written in the form of a URL, and receiving a reply responding to the request.

The content analysis section 210 receives from the communication section 205 a structured text file expressed in HTML, XML or the like, and acquires an analysis tree by performing lexical analysis and syntax analysis on this structured text file.

The document object model (DOM) generation section 215 receives the analysis tree from the content analysis section 210, and generates a DOM corresponding to a structure of the structured text file thus acquired. A DOM is a type of application programming interface (API). In a DOM, contents of content data, positions of the contents and styles of the contents are treated as objects, and an arrangement set for. A DOM is an arrangement set for controlling these objects by using a script language.

The DOM processing section 220 retains and manages, in the memory 104, the DOM generated by the DOM generation section 215 in the form of a tree structure expressing nested and nesting relationships among the objects. Additionally, in response to a request for access to nodes in the DOM tree which is made by the utilization of the DOM API, the DOM processing section 220 refers to an access history list corresponding to a source of the access request, the access history list maintained by the later-described history management section 260. Then, the DOM processing section 220 executes a content of the access request while allowing only the state display control program 300 to access to nodes recorded in the access history lists.

In other words, when the source of the access request is not the later-described state display control program 300, the DOM processing section 220 refers to the access history list. Then, if the access request requests access to any node recorded in the later-described access history list, the DOM processing section 220 prohibits the access. Note that, in an example of this embodiment, the DOM processing section 220 processes, without referring to an access history list, a DOM API call used for acquiring an object identifier of a DOM object corresponding to a screen element in a screen displayed on the display unit 114. This is because this DOM API is not recognized as a request for access to a node in the DOM tree. Instead, the DOM processing section 220 may execute the above described access control processing to all DOM API calls.

The layout determination section 225 determines a layout of an entirety of a text on the basis of the DOM retained by the DOM processing section 220. Note that, when the structured text file contains a script written in JavaScript or the like, the layout determination section 225 passes the script to the later-described script execution section 240.

The drawing section 230 displays text data and image data contained in the structured text file on the display unit 114 in accordance with the layout determined by the layout determination section 225.

The event notification section 235 receives an event such as operation made by a user via the input unit 112 or the display unit 114 serving as a touch screen, and then, notifies the DOM processing section 220 and the later-described event management interface section 255 of the event. The event notification section 235 first notifies the event management interface section 255 of the event. Then, if a destination of the notification of the event cannot be found by the event management interface section 255, the event notification section 235 notifies the DOM processing section 220 of the event.

Specifically, the event notification section 235 determines an object to process the received event from a group of objects constituting the DOM tree managed by the DOM processing section 220, and delivers the event to the determined object. The object, to which the event is delivered, processes the event by using an event handler previously registered in association with an instance or class of the object. Note that the event handler is written as a script, and is executed by the later-described script execution section 240.

The script execution section 240 executes a script serving as the event handler or a script received from the layout determination section 225. Specifically, in accordance with a content of the received script, the script execution section 240 updates a DOM retained by the DOM processing section 220 by the utilization of a DOM API, and then instructs the drawing section 230 to perform redrawing, or communicates with another computer such as a web server via the communication section 205.

The browser control section 245 opens or closes a window of the browser in accordance with a request from the later-described control request interface section 265 or as a result of the script execution performed by the script execution section 240. In addition, the browser control section 245 reads a structured text file having description of a certain screen configuration, and controls the browser 200 to display the file on the display unit 114, the structured text file being stored in the ROM 106 or the external storage unit 108.

The event management interface section (hereinafter also referred to simply as API-A) 250 is an API provided in accordance with an aspect of the present invention so that the state display control program 300 can hook an event delivered to a DOM object by the event notification section 235. In the example of this embodiment, the API-A 250 is called with arguments being an object identifier of a monitored object, a kind of a monitored event, an address of a function (a hook routine) called back when the event occurs, and these are registered in association with one another in an event management table (refer to FIG. 3). Note that, as shown in FIG. 3, character strings defined in JavaScript are used as they are for kinds of events in the example of this embodiment.

Upon receiving notification of an event from the event notification section 235, the API-A 250 determines whether or not the event is a monitored event having been registered in the event management table. When receiving notification of a monitored event, the API-A 250 reads, from the event management table, an address of a hook routine to be called back. Then, the occurrence of the event is notified by the API-A 250 to the state display control program 300, more specifically to a later-described event processing section 305. Thus, in the example of this embodiment, the event notification section 235 and the API-A 250 function together as event notification means of the browser 200.

The DOM request interface section (hereinafter also referred to simply as API-B) 255 is an API newly provided so that the state display control program 300 can access a DOM managed by the DOM processing section 220. The API-B 255 associates objects of the DOM and object identifiers in a DOM APT with each other, and maps in a DOM API a call made by the state display control program 300 to call the API-B 255.

In the example of this embodiment, when an ID (a character string) of a screen element in a screen displayed on the display unit 114 is taken as an argument to call the API-B 255, the API-B 255 calls getElementById by use of the thus received screen element ID as an argument. getElementById is an API that takes a tag of an id attribute of a structured text as an argument, and returns a DOM object corresponding to a screen element identified by the id attribute. Accordingly, in this case, the API-B 255 sends back an object identifier corresponding to an object returned from getElementById to a source of the call.

Additionally, in the example of this embodiment, when an object identifier of a DOM object is taken as an argument to call the API-B 255, the API-B 255 calls getNodeValue with respect to a DOM object identified from the object identifier. getNodeValue is a DOM API that returns a value depending on a kind of a node. Specifically, if the node is an attribute node, getNodeValue returns an attribute value and if the node is a text node getNodeValue returns a character string corresponding to a content of the text node. Accordingly, in this case, the API-B 255 sends back a return value from getNodeValue as it is to a source of the call.

Furthermore, in the example of this embodiment, when an object identifier of a DOM object and a certain character string is taken as an argument to call the API-B 255, the API-B 255 calls setNodeValue by use of the thus received character string as an argument with respect to the DOM object identified from the object identifier. setNodeValue is a DOM API that changes a value of a node to a value of the received argument.

Thus, when at least one specified argument including an object identifier of a DOM object is taken to call the API-B 255, the API-B 255 calls a DOM API by using argument other than the specified argument, with respect to the DOM object identified from the object identifier. Additionally, if a return value of the DOM API is a DOM object, the API-B 255 sends back an object identifier corresponding to the DOM object as it is to a source of the call. Otherwise, the API-B 255 sends back the return value thereto. Thus, calls for API-B 255 are mapped to DOM APIs.

Upon receiving a request for access to a node on a DOM tree from the state display control program 300, that is, upon being called by the state display control program 300 by use of an object identifier of a DOM object as one of arguments, the API-B 255 notifies the later-described history management section 260 of the access request. Instead, the API-B 255 may notify the later-described history management section 260 of all of calls from the state display control program 300. The former configuration is employed in the example of this embodiment.

Upon receiving from the API-B 255 a notification about the request made by the state display control program 300 for access to the DOM node, the history management section 260 records, in an access history list, an object identifier of a node to which access is requested. Examples of the access history list maintained by the history management section 260 include a list of object identifiers of nodes to which access has been requested, and a list in which object identifiers of nodes to which access has been requested are further recorded in association with contents of the access request (refer to FIG. 4). In the latter case, each notification from the API-B 255 contains: an object identifier of a node to which access is requested; and a content of the access. Thus, in this example of this embodiment, the API-B 255 and the history management section 260 function together as history management means of the browser 200.

Note that, as described above, when access to a node recorded in the access history list is requested by a request source other than the state display control program 300, the DOM processing section 220 prohibits the access. This means that the script execution section 240 cannot access a DOM node to which the state display control program 300 has once accessed. Accordingly, the state display control program 300 can safely display on the display unit 114 information in the multifunction printer 100 by the utilization of the browser 200.

The control request interface section (hereinafter also referred to simply as API-C) 265 is an API newly provided so that the state display control program 300 can control opening of a new browser window, closing of a browser window, and reading of a structured text.

In the example of this embodiment, when opening of a window is requested, the API-C 265 requests the browser control section 245 to open a new window, assigns an object identifier to the new window, and sends back the object identifier to the state display control program 300, more specifically, to a screen transition control section 315. Additionally, when an object identifier of a window is taken as an argument to call the API-C 265, the API-C 265 requests the browser control section 245 to close the window corresponding to the object identifier.

Additionally, when an object identifier of a window, a place (a URL) having a structured text stored therein, and an address of a function (a hook routine) of an "onLoad" event, the function called after reading of the structured text is completed, are taken as an argument to call the API-C 265, the API-C 265 requests the browser control section 245 to read the specified structured text. Furthermore, the API-C 265 calls the API-A 250 by use of the thus received object identifier of the window, the "onLoad" event, and the address of the hook routine as an argument, and requests the browser control section 245 to hook an event of reading the specified structured text. Thus, in this example of this embodiment, the browser control section 245 and the API-C 265 function together as browser control means of the browser 200.

Next, the state display control program 300 according to this embodiment will be described. In addition to a function of acquiring and setting information in an embedded device that a conventional external program has, the state display control program 300 according to this embodiment also has a function of directly controlling display of state information on the display unit 114, the state information indicating a state of the multifunction printer 100.

Here, the state information indicating a state of the multifunction printer 100 includes contents of settings currently set in the multifunction printer 100, a content of an error having occurred in the embedded device, and a status of a task currently processed by the embedded device. However, the state information is not limited to these pieces of information, and may include information, such as a current remaining amount of paper and presence or absence of a manuscript on a manuscript tray, which can indicate a state of the multifunction printer 100 and can be acquired by the multifunction printer 100 itself. Note that acquisition and setting of the state information by the state display control program 300 are performed via middleware or a device driver of the multifunction printer 100 as in the case of a conventional external program; and detailed description of methods for the acquisition and the setting will be omitted since the methods are already known.

The state display control program 300 according to this embodiment includes an event processing section 305, a device information management section 310, the screen transition control section 315 and an access request section 320. Upon being requested to display the state information indicating a state of the multifunction printer 100, the event processing section 305 processes the display request while giving instructions to the device information management section 310, the screen transition control section 315 and the access request section 320. Here, the request to display the state information may be any one of a request to display contents of settings currently set in the multifunction printer 100 in response to user operation, a request to display a content of an error in response to occurrence of the error in the multifunction printer 100, and a request to display a status of a task in response to the start of a task in the multifunction printer 100.

Note that the event processing section 305 is notified of the request to display the error content or the request to display the status when the later-described device information management section 310 transfers, to the event processing section 305, error occurrence notification or task status notification received from middleware or a device driver of the multifunction printer 100. On the other hand, in the case of the request to display the setting contents, the event processing section 305 is required to previously call the API-A 250 in order to hook an event of user operation that indicates checking or changing of the setting contents.

For example, suppose that the user operation that indicates checking or changing of the setting contents is pressing of a predetermined button in a main screen initially displayed on the display unit 114 at the startup of the multifunction printer 100. In this case, when the main screen is displayed, the event processing section 305 hooks the event of pressing of the predetermined button by calling the API-A 250 by taking as arguments an object identifier of an object corresponding to the predetermined button, an "onClick" event, and an address of a hook routine to be called back upon detection of the event. Note that the object identifier of the object corresponding to the predetermined button is acquired by calling the API-B 255 via the later-described access request section 320. Additionally, the hook routine called back by referring to the above address is the event processing section 305 that performs processing corresponding to the above event of pressing of the predetermined button.

Upon detection of the request to display the state information, the event processing section 305 requests the later-described screen transition control section 315 to display one of the setting contents, the error content, or the task status in accordance with a kind of the state information which is requested to be displayed.

Additionally, when a text file having description of a certain screen configuration is read by the browser 200 in response to the display request of the status information, the event processing section 305 requests the later-described device information management section 310 to acquire the current state information on the multifunction printer 100 in response to the notification of an event of reading the text file.

Here, if the request to display the state information is the request to display the setting contents, a corresponding certain text file is a settings screen text file stored in the ROM 106 or the external storage unit 108. Note that the settings screen text file may exist in plurality so as to correspond to functions of the multifunction printer 100. In this case, the event processing section 305 previously includes information on settings screen text files to be displayed respectively depending on kinds of the setting contents which is requested to be displayed. Thereby, the event processing section 305 specifies a settings screen text file to be displayed and notifies it to the screen transition control section 315. Then, the event processing section 305 requests the device information management section 310 to acquire at least one setting value to be displayed on a settings screen, the setting values being currently set in the multifunction printer 100.

Meanwhile, if the request to display the state information is the request to display the error content, a corresponding certain text file is an error-notification screen text file stored in the ROM 106 or the external storage unit 108. Here, the event processing section 305 requests the device information management section 310 to acquire a code or content of the error having occurred inside the multifunction printer 100 which is to be displayed on an error notification screen.

Moreover, if the request to display the state information is the request to display the task status, a corresponding certain text file is a status-display screen text file stored in the ROM 106 or the external storage unit 108. Here, the event processing section 305 requests the device information management section 310 to acquire the status of the task currently processed in the multifunction printer 100 which is to be displayed on a status display screen.

Additionally, when the current state information on the multifunction printer 100 is acquired by the device information management section 310, the event processing section 305 requests the later-described access request section 320 to update at least one certain screen element in a screen currently displayed on the display unit 114 with the thus acquired current state information. Note that the event processing section 305 previously retains therein information on the at least one certain screen element to be updated in accordance with the kind of the state information, and passes an ID of the certain screen element to the access request section 320.

Additionally, when change of setting contents currently set in the multifunction printer 100 is requested by the user, the event processing section 305 requests the later-described access request section 320 to refer to a value of at least one certain screen element in a screen currently displayed on the display unit 114 in response to notification of an event of user operation indicating the change request. Note that the value of the at least one certain screen element, which is to be referred to, is data having been inputted in an input form such as a text box, a radio button and a check box. The event processing section 305 previously retains therein information on the at least one certain screen element to be referred to, for every event of the change request of which the event processing section 305 is notified. Thereby, the event processing section 305 passes an ID of the certain screen element to the access request section 320.

Then, when the value of the at least one certain screen element is successfully referred to by the access request section 320, the event processing section 305 requests the later-described device information management section 310 to change contents in setting items corresponding to the certain screen element to the referred values. Note that the event processing section 305 is supposed to previously retain therein information on setting items to be updated, for each kind of the change request of which the event processing section 305 is notified.

In response to the request to display the state information, the screen transition control section 315 requests browser means to display a text file having description of a certain screen configuration. Specifically, the screen transition control section 315 calls the API-C 265 and requests the API-C 265 to open a new window, and receives an object identifier assigned to the new window as a return value.

Subsequently, the screen transition control section 315 calls the API-C 265 again and passes the thus received object identifier, a storage place of the text file having description of the certain screen structure, and an address of a function (a hook routine) of an "onLoad" event as arguments to the API-C 265, the function called back at the completion of browser 200's reading the text file.

Note that, as described above, the screen transition control section 315 receives the request to display the state information from the event processing section 305. Additionally, the storage place of the text file having description of the certain screen structure, which is passed by the screen transition control section 315 to the API-C 265 as the argument, is different in accordance with a kind of the state information. The storage place is any one of a storage place for the settings screen text file, the error-notification screen text file and the status-display screen text file.

Additionally, the hook routine called back with reference to the above address is the event processing section 305 that performs processing corresponding to an event of reading the text file having description of the certain screen configuration. The screen transition control section 315 may retain therein information on arguments to be passed to the API-C 265 for each kind of the display request. Alternatively, the event processing section 305 may retain this information therein, and specify the information to the screen transition control section 315.

Note that, as described above, the API-C 265 called by the screen transition control section 315 with the arguments being specified, requests the browser control section 245 to read a specified text file. Furthermore, the API-C 265 calls the API-A 250 by taking as arguments an object identifier of a window, the "onLoad" event, and the address of the hook routine which the API-C 265 receives from the screen transition control section 315. Then, the API-C 265 requests the API-A 250 to register, in the event management table, the event of reading the specified text file. Accordingly, when the text file having description of the certain screen configuration is read by the browser 200, the event processing section 305 is notified of the read event, and thereby can continue processing corresponding to the state information of which display is requested.

The device information management section 310 receives error occurrence notification of an error having occurred in the multifunction printer 100 from the middleware or device driver of the multifunction printer 100. Additionally, the device information management section 310 receives a status report showing a status of processing of a task currently processed by the multifunction printer 100.

For example, a paper jam, a toner shortage and the like can be listed as errors on which the notification is received. Additionally, for example, image capture, facsimile reception and the like can be listed as tasks on which status reports are received. In each of these cases, a content of the status may be a percentage of an already processed part of the task to the entirety thereof, or a processing content currently in execution (for example, any one of "negotiation in process", "data reception in process" and "reception completed" in the case of facsimile reception). As described above, upon receiving the above notification, the device information management section 310 notifies the event processing section 305 of this notification.

The device information management section 310 also acquires information on a current state of the multifunction printer 100 in response to the browser 200 reading the text file having description of the certain screen configuration. As described above, if the text file having description of the certain screen configuration is the settings screen text file, the device information management section 310 acquires the setting values currently set in the multifunction printer 100 which is to be displayed as the current state information on a settings screen.

If the text file having description of the certain screen configuration is the error-notification screen text file, the device information management section 310 acquires the error code or content of the error having occurred in the multifunction printer 100, which is to be displayed as the current state information on the error notification screen.

If the text file having description of the certain screen configuration is the status-display screen text file, the device information management section 310 acquires the status of the task currently processed in the multifunction printer 100, which is to be displayed as the current state information on the error notification screen.

Note that, the device information management section 310 is requested to acquire the above current state information by the event processing section 305, which has received the notification of the event of reading the text file having description of the certain screen configuration. Additionally, the device information management section 310 acquires the above current state information from the middleware or device driver of the multifunction printer 100. The thus acquired current state information is passed from the device information management section 310 to the access request section 320.

Moreover, when change of setting contents currently set in the multifunction printer 100 is requested, the device information management section 310 changes the setting contents currently set in the multifunction printer 100 in response to a request from the event processing section 305.

A request made by the user to change a setting content is made via the browser 200 having read the settings screen text file. A content to be newly set in the multifunction printer 100 is acquired by having the later-described access request section 320 refer to a value of a certain node on a DOM tree corresponding to the settings screen text file. The device information management section 310 changes the setting content currently being set in the multifunction printer 100 which corresponds to the above certain node to the value of the certain node acquired by the access request section 320. Note that the setting item to be changed is specified by the event processing section 305.

In response to the request from the event processing section 305, the access request section 320 requests the browser 200 to update value of at least one certain node with the current state information of the multifunction printer 100 acquired by the device information management section 310, the at least one certain node being in a DOM tree generated by the browser 200 from the text file having description of the certain screen configuration. As described above, the update request made by the event processing section 305 contains an ID (character strings) of at least one certain screen element in a screen currently displayed on the display unit 114.

Specifically, the access request section 320 first calls the API-B 255 by taking as an argument an ID (character string) of the screen element, for the at least one specified certain screen elements. The thus called API-B 255 calls getElementById by taking as an argument the thus received IDs (character strings), and then sends back object identifiers of returned objects to the access request section 320.

Subsequently, the access request section 320 calls the API-B 255 again, and passes as arguments thereto: the thus received objects identifiers; and the current state information of the multifunction printer 100 acquired by the device information management section 310. The thus called API-B 255 calls setNodeValue by taking as an argument the thus received current state information, for each of objects identified by the object identifiers. Thereby, the value of the screen elements displayed on the display unit 114 and corresponding to the certain node is updated with the current state information of the multifunction printer 100. Note that, the DOM processing section 220 requested to permit access to the DOM objects determines a source of the request to be the state display control program 300 on the basis of a situation where a DOM API has been called by the API-B 255. Then, the DOM processing section 220 permits the access without referring to the access history list.

In addition, when change of setting contents currently set in the multifunction printer 100 is requested, the access request section 320 requests the browser 200 to refer to value of at least one certain node in the DOM tree generated by the browser 200 from a settings screen text file in which a screen configuration for changing the setting contents is written. Note that, as described above, the event processing section 305 provides notification of the request to change the setting contents. The notification contains an ID (character strings) of the at least one certain screen element whose value is to be referred to.

Specifically, for the at least one specified node, the access request section 320 first calls the API-B 255 by taking as an argument an ID (character string) of a screen element that is the corresponding node. The thus called API-B 255 calls getElementById by taking as an argument each of the thus received IDs (character strings), and then sends back object identifiers of returned objects to the access request section 320.

Subsequently, the access request section 320 calls the API-B 255 again, and passes thereto each of the thus received objects identifiers as an argument. The thus called API-B 255 calls setNodeValue for objects identified by the object identifiers. Return values from getNodeValue are sent back as it is by the API-B 255 to the access request section 320. The access request section 320 passes return values from the API-B 255 to the device information management section 310 in accordance with an instruction from the event processing section 305.

Note that, the DOM processing section 220 requested to permit access to a DOM object determines a source of the request to be the state display control program 300 on the basis of a situation where a DOM API has been called by the API-B 255. Then, the DOM processing section 220 permits the access without referring to the access history list.

It may be noted that, as described above, API-B255 notifies to the history management section 260 the request to access a node in the DOM tree from the access request section 320 that is the state display control program 300. Then, the history management section 260 records an object to which access is requested.

Next, with reference to FIGS. 5A to 15, operations of the browser 200 and the state display control program 300 will be described. Note that, described below are a first example in which the state information of the multifunction printer 100 which is requested to be displayed is contents of settings currently set in the multifunction printer 100, and a second example in which the state information of the multifunction printer 100 which is requested to be displayed is a content of an error having occurred inside the embedded device.

First, with reference to FIGS. 5A to 11, there will be described operations of the browser 200 and the state display control program 300 in a case where the state information of the multifunction printer 100 which is requested to be displayed, is contents of the settings currently set in the multifunction printer 100.

FIG. 5A shows one example of a main screen initially displayed on the display unit 114 at the startup of the multifunction printer 100. In this example, since the multifunction printer has a copy function and a scan function, setting buttons 502 and 504 respectively for these functions are included in the main screen. Here, if the copy setting button 502 is pressed, the multifunction printer 100 in this example causes a screen on the display unit 114 to transition from the main screen shown in FIG. 5A to a sub screen shown in FIG. 5B.

FIG. 5B shows one example of a settings screen for making various settings for and checking on copy. The sub screen shown in FIG. 5B includes four buttons, which are a sheet size setting button 506, a copy number setting button 508, a scaling factor setting button 510 and a density setting button 512. In cells 514 to 520 located to the right sides of the respective buttons, corresponding current setting contents are displayed. Here, if the sheet size setting button 506 is pressed, the multifunction printer 100 in this example causes a screen on the display unit 114 to transition from the sub screen shown in FIG. 5B to a sub screen shown in FIG. 5C.

FIG. 5C shows one example of a setting screen for setting a sheet size. The sub screen shown in FIG. 5C includes radio buttons 522 for respectively selecting sheet sizes A4, A3, B4 and B5, a confirm button 524 for executing change, and a cancel button 526 for cancelling change.

Figure 6:
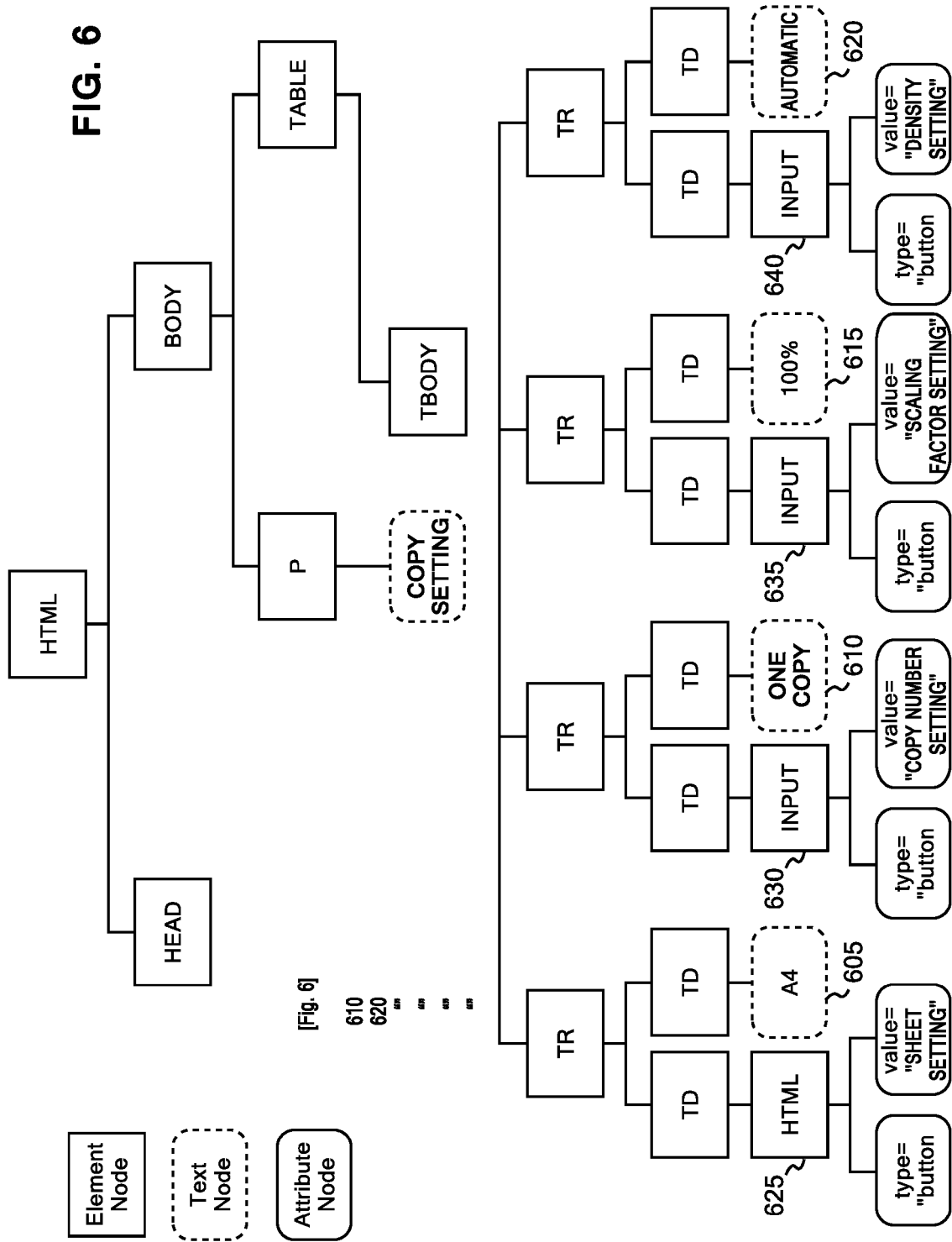
FIG. 6 shows a DOM tree corresponding to the sub screen shown in FIG. 5B.
Figure 7:
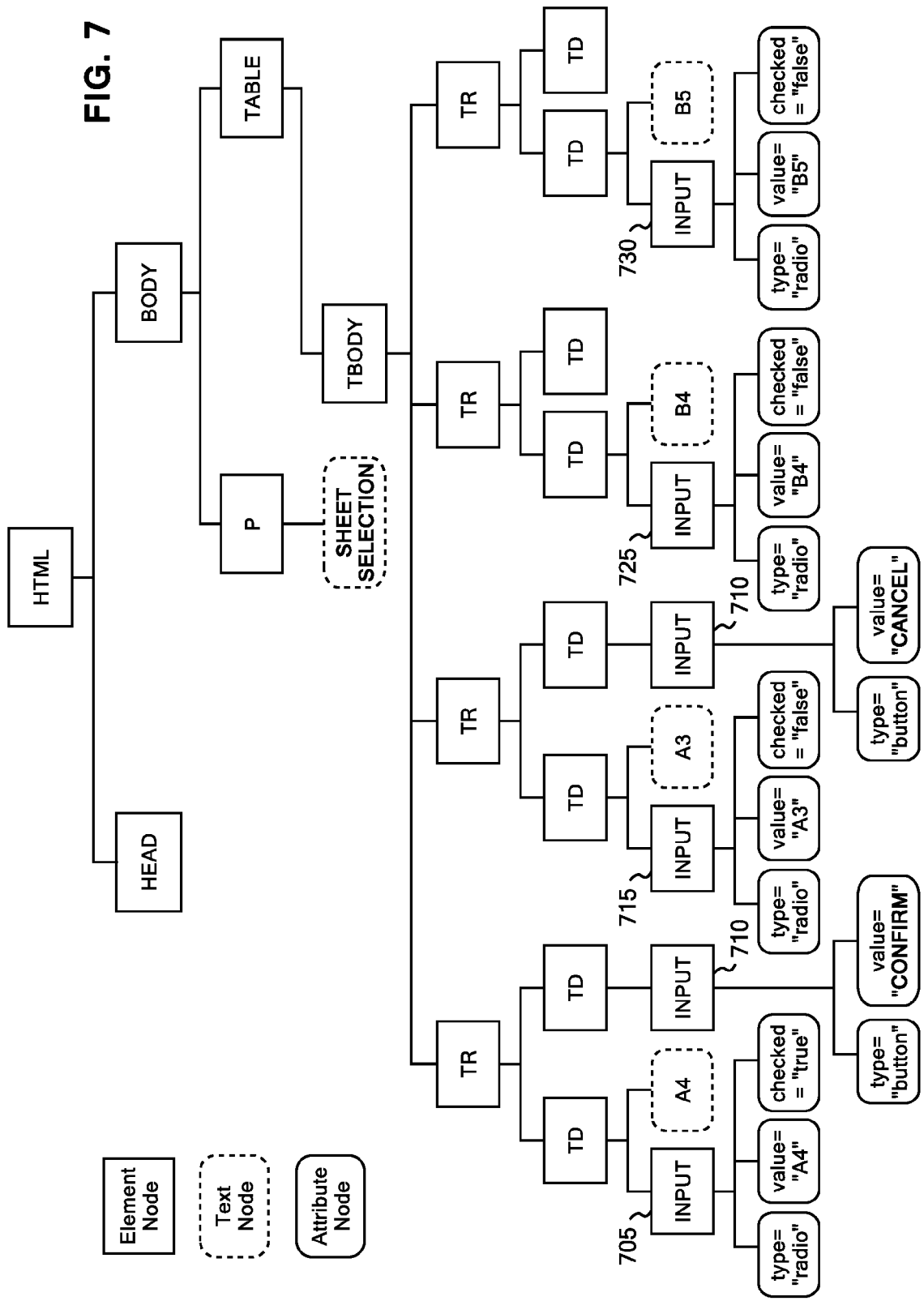
FIG. 7 shows a DOM tree corresponding to the sub screen shown in FIG. 5C.

FIG. 6 shows one example of a DOM tree corresponding to the sub screen shown in FIG. 5B. Additionally, FIG. 7 shows one example of a DOM tree corresponding to the sub screen shown in FIG. 5C.

The operations of the browser 200 and the state display control program 300 will be described below by taking, as a specific example, a case where a user checks and changes setting contents on copy setting via the sub screens shown in FIGS. 5B and 5C after the main screen shown in FIG. 5A is displayed on the display unit 114.

Figure 8:
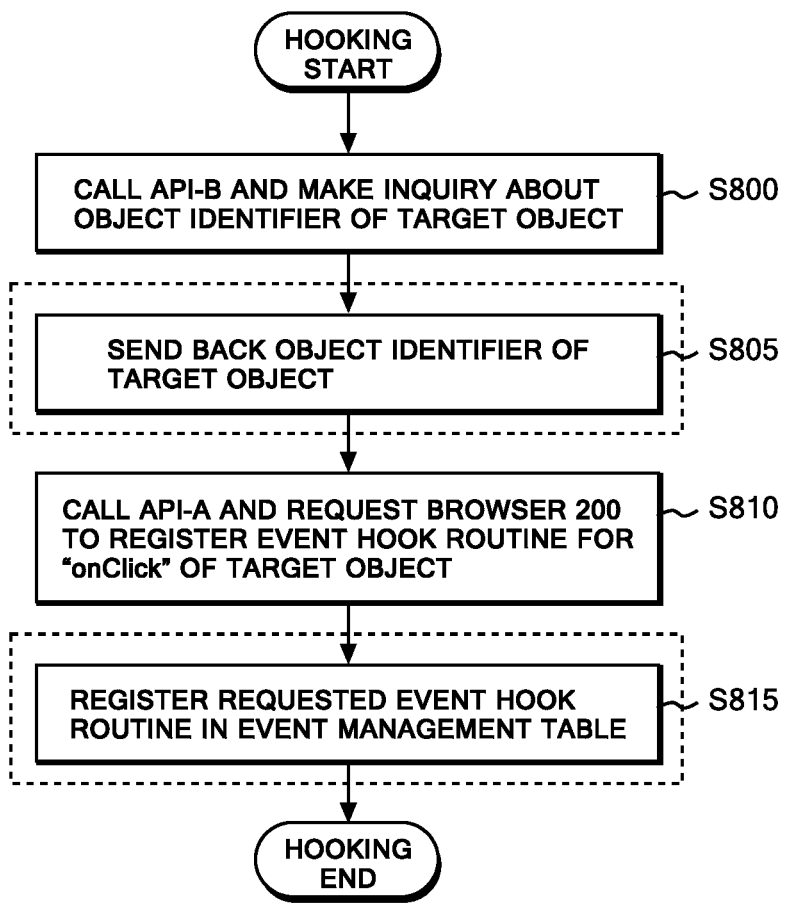
FIG. 8 shows one example of a processing flow of a hooking event according to this embodiment.

FIG. 8 is a flowchart showing one example of a flow of event hooking processing, which is performed as preprocessing by the state display control program 300 to control screen display performed by a browser. Note that, in all the flowchart diagrams, steps executed by the browser 200 are surrounded by dashed lines so as to be distinguished from steps executed by the state display control program 300. The processing is started from step 800, and the access request section 320 calls the API-B 255 by taking as an argument an ID (character string) of a target object in response to a request from the event processing section 305, and then inquires of the API-B 255 about an object identifier of the target object.

Here, the target object means a screen element in a screen displayed on the display unit 114, and an object that is to hook an event corresponding to the screen element. For example, close buttons on the respective screens shown in FIGS. 5A to 5C, the respective setting buttons 502 to 512 shown in FIGS. 5A to 5B, and the radio buttons 522, confirm button 524 and cancel button 526 shown in FIG. 5C all can be target objects.

By calling getElementById by taking as an argument the received ID (character string) of a screen element, the API-B 255 specifies a corresponding object, and then sends back an object identifier of the object to the event processing section 305 via the access request section 320 (step 805). This step will be described with reference to FIG. 5B showing the settings screen for copy setting, and FIG. 6 showing the DOM tree corresponding to the settings screen shown in FIG. 5B. For example, suppose that inquiry has been made on an object identifier of the sheet size setting button 506 in the screen shown in FIG. 5B. Consequently, the API-B 255 identifies an INPUT node 625 in the DOM tree shown in FIG. 6 as an object corresponding to the sheet size setting button 506, and sends back an object identifier thereof.

Subsequently, the event processing section 305 calls the API-A 250 by taking as arguments the acquired object identifier, an "onClick" event, and an address of a hook routine to be called back upon detection of the event. Thereby, the event processing section 305 requests the browser 200 to register an event hook routine for an "onClick" event of the target object (step 810).

The API-A 250 registers respective values received as the arguments in the event management table as shown in FIG. 3 (step 815). Then, the hook processing is terminated. Note that: the preprocessing shown in the flowchart of FIG. 8 is performed in response to the request from the event processing section 305 when a screen containing the target object is displayed on the display unit 114; and the request from the event processing section 305 includes an ID (character string) of the target object. Additionally, the preprocessing is performed for all of the target objects in the screen, the target objects being necessary for the state display control program 300 to control screen display performed by the browser 200.

Figure 9:
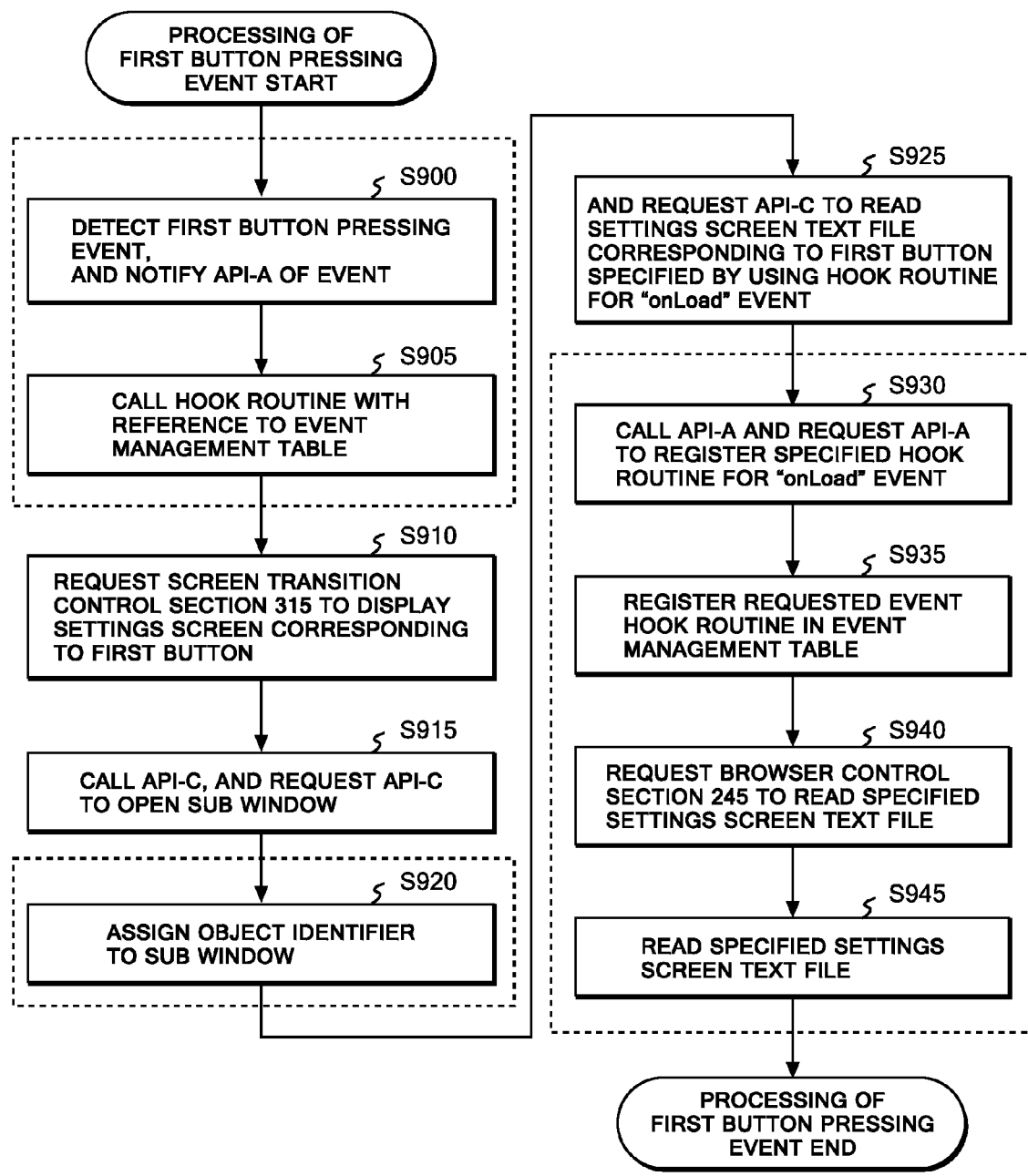
FIG. 9 shows one example of a processing flow of a first button press event according to this embodiment.

FIG. 9 is a flowchart showing one example of a flow of event processing executed when an event of pressing a first button occurs. Here, the first button is a button for an object whose "onClick event" causes a screen on the display unit 114 to transition, the object being one among the objects registered in the event management table in the preprocessing. For example, each of the setting buttons 502 to 512 in the screens shown in FIGS. 5A and 5B can be applicable as the first button.

The processing is started from step 900. Upon detecting the first button pressing event, the event notification section 235 notifies the API-A 250 of this event. The API-A 250 reads out from the event management table an address of a hook routine corresponding to the first button pressing event, and calls, with reference to the address, the event processing section 305 that is to process the first button pressing event (step 905).

The event processing section 305 having received the notification of the pressing event requests the screen transition control section 315 to display a settings screen corresponding to the first button (step 910). Note that the event processing section 305 is supposed to be previously provided with information, for each kind of the first button, on a settings screen to be displayed when the "onClick" event occurs. For example, in a case where the first button is the copy setting button 502 shown in FIG. 5A, the settings screen corresponding thereto is the sub screen shown in FIG. 5B. Additionally, in a case where the first button is the sheet size setting button 506 shown in FIG. 5B, the settings screen corresponding thereto is the sub screen shown in FIG. 5C.

The screen transition control section 315 calls the API-C 265 in response to the request from the event processing section 305, and requests the API-C 265 to open a sub window (step 915). While requesting the browser control section 245 to open a new sub window, the called API-C 265 assigns an object identifier to the thus opened sub window, and sends back this object identifier to the screen transition control section 315 (step 920).

Subsequently, the screen transition control section 315 calls the API-C 265 again by taking as arguments the object identifier of the sub window returned thereto from the API-C 265, a storage place of a settings screen text file in which a configuration of the settings screen corresponding to the first button is written, and an address of a hook routine for an "onLoad" event, the hook routine called at the completion of reading of the settings screen text file (step 925).

The thus called API-C 265 then calls the API-A 250 by taking as arguments the received object identifier, the "onLoad" event, and the address of the hook routine, and requests the API-A 250 to register the event hook routine for the "onLoad" event of a settings screen text file corresponding to the sub window (step 930). The API-A 250 registers, in the event management table as shown in FIG. 3, values respectively received as the arguments from the API-C 265 (step 935).

The API-C 265 also specifies the object identifier of the sub window and the storage place of the settings screen text file, and requests the browser control section 245 to read the settings screen text file (step 940). The browser control section 245 reads the settings screen text file by referring to the storage place for the sub window identified by the object identifier, and controls the browser 200 so that the text file can be displayed on the display unit 114 (step 945). Then, the processing of the first button pressing event is terminated.

Figure 10:
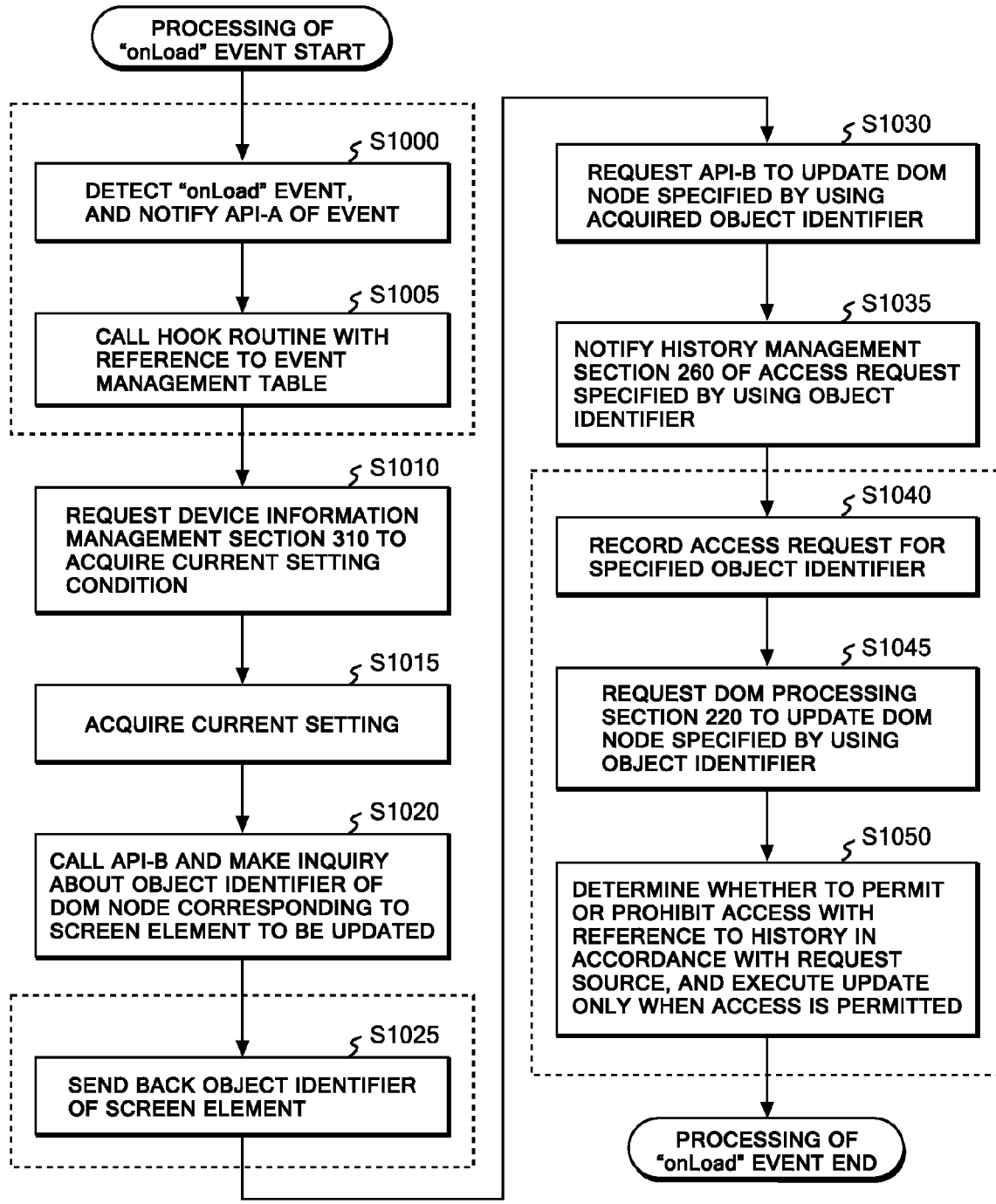
FIG. 10 shows one example of a processing flow of an "onLoad" event according to this embodiment.

FIG. 10 is a flowchart showing one example of a flow of event processing executed when an "onLoad" event of a settings screen text file occurs. Note that the settings screen text file described here is a settings screen text file that displays setting contents currently set in the multifunction printer 100, as in the screen shown in FIG. 5B, when the setting screen text is read by the browser 200.

The processing is started from step 1000, and, upon detecting the event of reading the settings screen text file, the event notification section 235 notifies the API-A 250 of this event. The API-A 250 reads out from the event management table an address of a hook routine corresponding to the event of reading the settings screen text file, and calls, with reference to the address, the event processing section 305 that is to process the event of reading the settings screen text file (step 1005).

The event processing section 305 having received the notification of the event of reading the settings the screen text file requests the device information management section 310 to acquire setting contents currently set in the multifunction printer 100 (step 1010). On this occasion, the event processing section 305 specifies a setting item to be inquired in accordance with a kind of the read settings screen text file. For example, in a case where the settings screen shown in FIG. 5B is displayed on the display unit 114 in accordance with the settings screen text file, the event processing section 305 requests the device information management section 310 to acquire setting contents currently set in the multifunction printer 100 with respect to a sheet size, the number of copies, a scaling factor and a density.

The device information management section 310 having been requested by the event processing section 305 acquires a setting content on the specified content items among the setting contents being currently set in the multifunction printer 100 from the middleware or device driver of the multifunction printer 100 (step 1015). The thus acquired setting content is passed from the device information management section 310 to the access request section 320 in accordance with an instruction from the event processing section 305.

In response to a request from the event processing section 305, the access request section 320 calls the API-B 255 by taking as an argument an ID (character string) of a screen element through which a setting content is to be displayed in the screen displayed on the display unit 114. Then, the access request section 320 inquires of the API-B 255 about an object identifier of a DOM object corresponding to the screen element (step 1020). The API-B 255 identifies the object corresponding to the screen element by calling getElementById by taking as an argument the received ID (character string) of the screen element, and then returns an object identifier of the object to the access request section 320 (step 1025). Note that: the ID (character string) of the screen element, in which a setting content is to be displayed, is contained in the request of the event processing section 305; and the inquiry is made multiple times in a case where there are multiple IDs (character strings) of the screen elements.

The above processing will be described with reference to FIG. 5B showing the settings screen for copy setting, and FIG. 6 showing the DOM tree corresponding to the settings screen shown in FIG. 5B. In the settings screen shown in FIG. 5B, the cells 514 to 520 are screen elements through which setting contents are displayed. Note that, in a text file in which a screen configuration of the settings screen shown in FIG. 5B is written, character strings displayed in the respective cells are not written. Here, suppose that an object identifier of the cell 514, in which a character string "A4" is displayed, is inquired. Consequently, the API-B 255 identifies a text node 605 in the DOM tree shown in FIG. 6 as an object corresponding to the cell 514, and returns an object identifier thereof.

With reference to FIG. 10 again, the access request section 320 calls the API-B 255 again by taking as arguments: the object identifiers thus acquired; and the setting contents received from the device information management section 310. Thereby, the access request section 320 requests the API-B 255 to update a value of each of nodes in the DOM tree, each node being identified by the corresponding object identifier (step 1030).

The API-B 255 requested to update the value notifies the history management section 260 that access to each of the nodes in the DOM tree, the nodes identified by the respective object identifiers received as the argument, has been requested by the state display control program 300 (step 1035). The thus notified history management section 260 records, in the access history list retained therein, all the object identifiers that the history management section 260 are notified of (step 1040).

Additionally, the API-B 255 requests the DOM processing section 220 to update, with the setting contents, the value of each of the nodes in the DOM tree, each node identified by the corresponding object identifiers (step 1045). As described above, the request is made repeatedly for the respective object identifiers. In each request, with respect to corresponding one of the objects identified from the corresponding object identifier, the API-B 255 calls setNodeValue by taking as an argument corresponding one of the received setting contents.

The DOM processing section 220 having received the request determines whether to permit or to prohibit access with reference to the access history list maintained by the history management section 260 in accordance with a source of the request. Specifically, in a case where a source of the access request is not the state display control program 300, the DOM processing section 220 refers to the list of nodes. Then, the DOM processing section 220 denies the access request if the request is for access to a node recorded in the access history list.

Here, since the request for access to a node in the DOM tree is made via the API-B 255, the DOM processing section 220 determines that the source of the access request is the state display control program 300. Then the DOM processing section 220 allows the access request without referring to the access history list, and executes a content of the access request. Consequently, values of the nodes in the DOM tree, which are identified by the respective object identifiers, are updated with corresponding setting contents (step 1050).

Here, description is made by taking as an example an "onLoad" event of a text file in which the screen configuration of the sub screen shown in FIG. 5B is written. When the processing in step 1050 is executed, character strings "A4", "one copy", "100%" and "automatic" are displayed in the respective cells 514 to 520 in FIG. 5B which have been initially blank. Then, the "onLoad" event processing is terminated.

Note that, although not being shown in the flowchart of FIG. 10, the event processing section 305 having received the notification of the event of reading the settings screen text file in step 1010 performs the event-hooking processing for the target object in the settings screen as shown in FIG. 8 at appropriate timing, for example, after the processing in step 1050 and the like.

Figure 11:
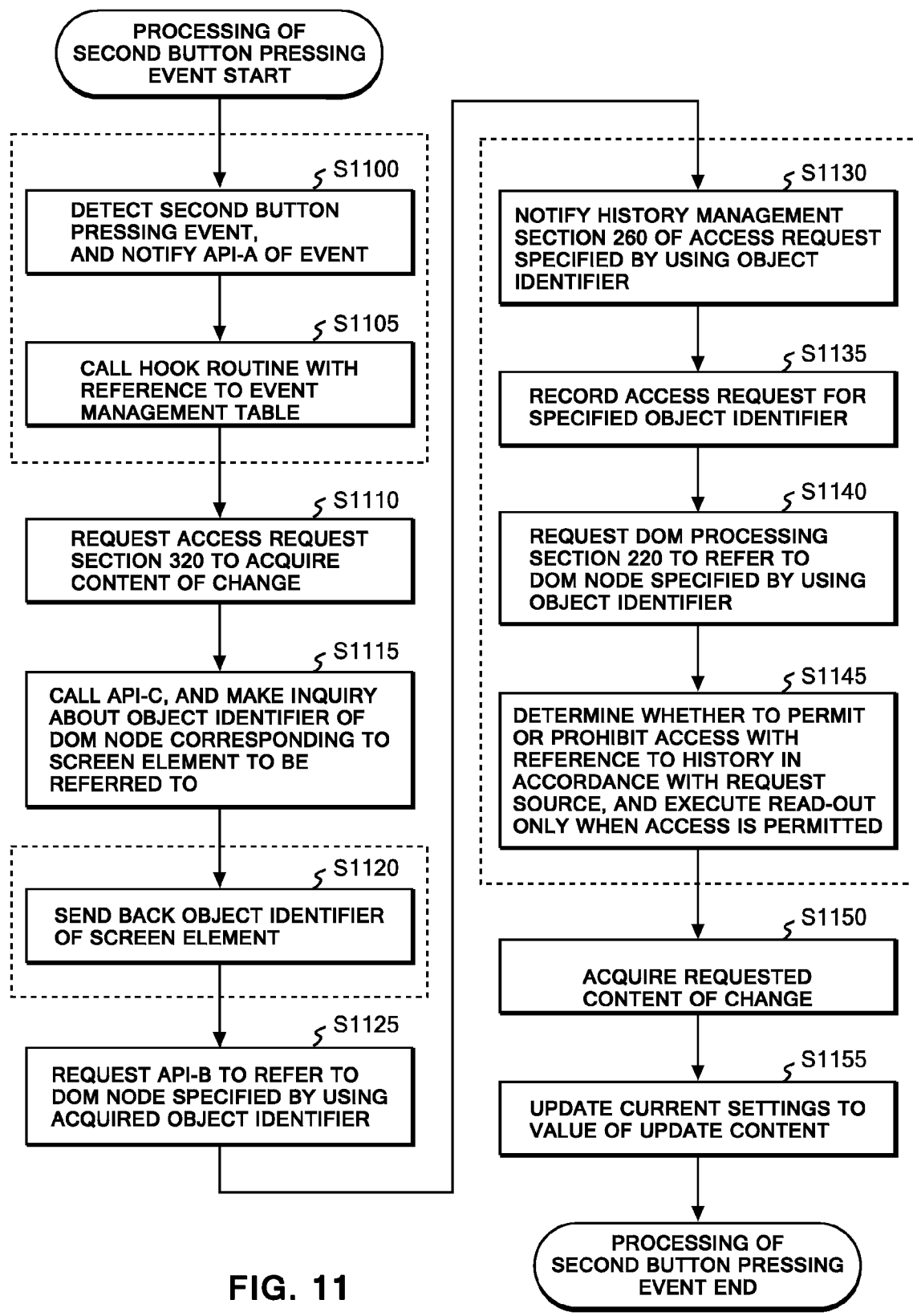
FIG. 11 shows one example of a processing flow of a second button press event according to this embodiment.

FIG. 11 is a flowchart showing one example of a flow of event processing performed when an event of pressing a second button occurs. Here, the second button is an object whose button pressing operation indicates request to change setting contents. For example, the confirm button 524 in the screen shown in FIG. 5C can be applicable as the second button.

The processing is started from step 1100. Upon detecting the second button pressing event, the event notification section 235 notifies the API-A 250 of this event. The API-A 250 reads out from the event management table an address of a hook routine corresponding to the second button pressing event, and calls, with reference to the address, the event processing section 305 that is to processes the second button pressing event (step 1105).

The event processing section 305 having received the notification of the second button pressing event requests the access request section 320 to acquire a content of the change (step 1110). On this occasion, the event processing section 305 passes to the access request section 320 an ID (character string) of a screen element, whose value is to be referred to, in a screen on the display unit 114.

In response to the request from the event processing section 305, the access request section 320 calls the API-B 255 by taking as an argument the ID (character string) of the screen element whose value is to be referred to, and then inquires of the API-B 255 about an object identifier of a DOM object corresponding to the screen element (step 1115). The API-B 255 identifies an object corresponding to the screen element by calling getElementById by taking as an argument the received ID (character string) of the screen element, and then sends back an object identifier of the object to the access request section 320 (step 1120). Note that the inquiry is made multiple times in a case where there are multiple screen elements whose values are to be referred to for acquiring the contents of the changes.

Subsequently, by calling the API-B 255 again by taking as an argument each of the acquired object identifier, the access request section 320 requests to refer to a value of each of nodes in the DOM tree, each node identified by the corresponding object identifier received as the argument (step 1125).

The API-B 255 to which reference is requested notifies the history management section 260 that the state display control program 300 has requested access to each of the nodes in the DOM tree, each node being identified by the corresponding object identifier received as the argument (step 1130). The thus notified history management section 260 records, in the access history list retained therein, all of the object identifiers that the history management section 260 is notified of (step 1135).

The API-B 255 additionally requests the DOM processing section 220 to refer to a value of each of the nodes in the DOM tree, each node identified by the corresponding object identifier (step 1140). As described above, the request is made repeatedly for the respective object identifiers. In each request, with respect to corresponding one of the objects identified from the corresponding object identifier, the API-B 255 calls getNnodeValue.

The DOM processing section 220 having received the request refers to the access history list maintained by the history management section 260 in accordance with a source of the request, and thereby determines whether to permit or to prohibit the access. Specifically, in a case where the source of the request is not the status display control program 300, the DOM processing section 220 refers to the access history list. Then, the DOM processing section 220 denies the access request if the request is for access to a node recorded in the access history list.

Here, since the access to a node in the DOM tree is requested via the API-B 255, the DOM processing section 220 determines that the source of the request is the state display control program 300. Then, the DOM processing section 220 permits the access without referring to the access history list, and executes a content of the access request. Consequently, the access request section 320 acquires the contents of change via the API-B 255 (step 1145).

The processing from step 1110 to step 1145 will be described with reference to FIG. 5C showing a settings screen for copy setting and FIG. 7 showing the DOM tree corresponding to the settings screen in FIG. 5C. In the settings screen shown in FIG. 5C, each of the radio buttons 522 is a screen element that can indicate the content of the change. Here, suppose that an object identifier of the uppermost one of the radio buttons 522 has been inquired by the access request section 320. Then, the API-B 255 identifies an INPUT node 705 in the DOM tree shown in FIG. 7 as an object corresponding to the uppermost radio button 522, and sends back an object identifier thereof.

Here, as can be found from FIG. 7, in order to know a content of the change in the settings screen utilizing the radio buttons, it is necessary to check not the INPUT node 705 but a value of an attribute node that is a child node of the INPUT node 705. Therefore, in such a case, the event processing section 305 instructs the access request section 320 to: find the INPUT node 705 having a checked attribute node whose value is true; and then acquire a value of a value attribute node that is a child node of the INPUT node 705. Consequently, in the example shown in FIG. 7, the access request section 320 eventually acquires a value "A4" as the content of change. Note that, also in the case of a settings screen utilizing check boxes, the access request section 320 can acquire the content of the change in similar manner.

With reference to FIG. 11 again, the access request section 320 receives a result of the reference from the DOM processing section 220 via the API-B 255, thereby acquiring the content of change (step 1150). The content of change is passed from the access request section 320 to the device information management section 310 in accordance to instruction from the event processing section 305. In accordance to instruction from the event processing section 305, the device information management section 310 updates the current setting contents with the thus received content of change via the middleware or device driver of the multifunction printer 100, and thereby changes the setting contents (step 1155). Then, the second button pressing event is terminated.

Next, with reference to FIGS. 12 to 15, there will be described operations of the browser 200 and the state display control program 300 in a case where the state information of the multifunction printer 100 which is requested to be displayed is a content of an error having occurred in the multifunction printer 100.

Figure 12:
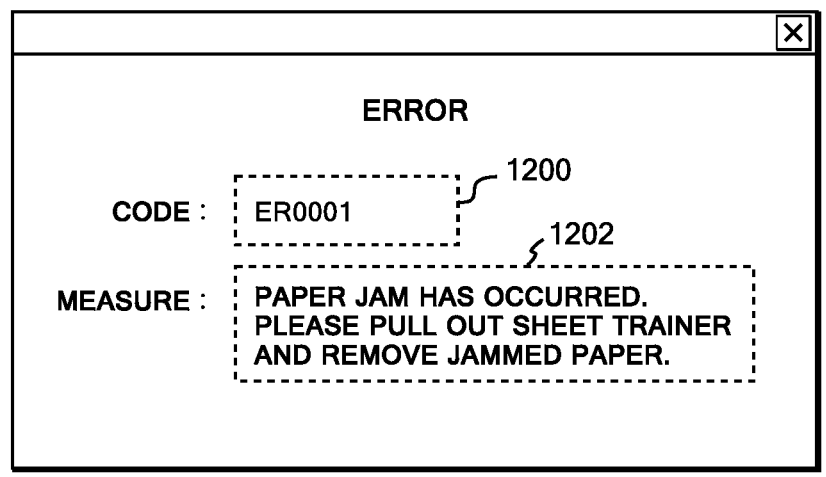
FIG. 12 shows one example of an error notification screen of the multifunction printer 100 according to this embodiment.

FIG. 12 shows one example of an error notification screen displayed on the display unit 114 when an error has occurred in the multifunction printer 100. An error code 1200 and a measure 1202 which are provided as the content of the error are displayed in the error notification screen shown in FIG. 12.

Figure 13:
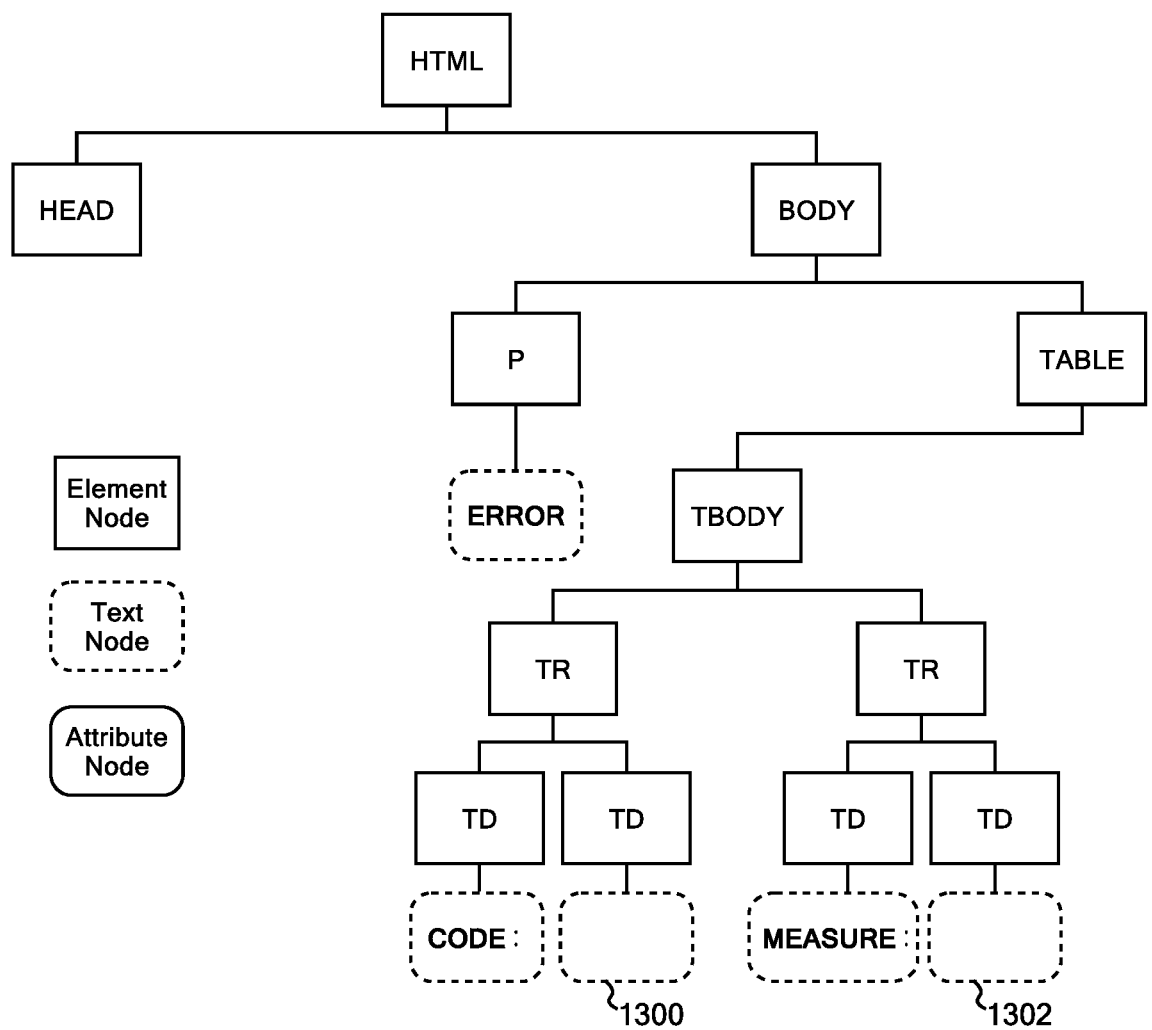
FIG. 13 shows a DOM tree corresponding to the error notification screen shown in FIG. 12.

FIG. 13 shows one example of a DOM tree corresponding to the error notification screen shown in FIG. 12.

Figure 14:
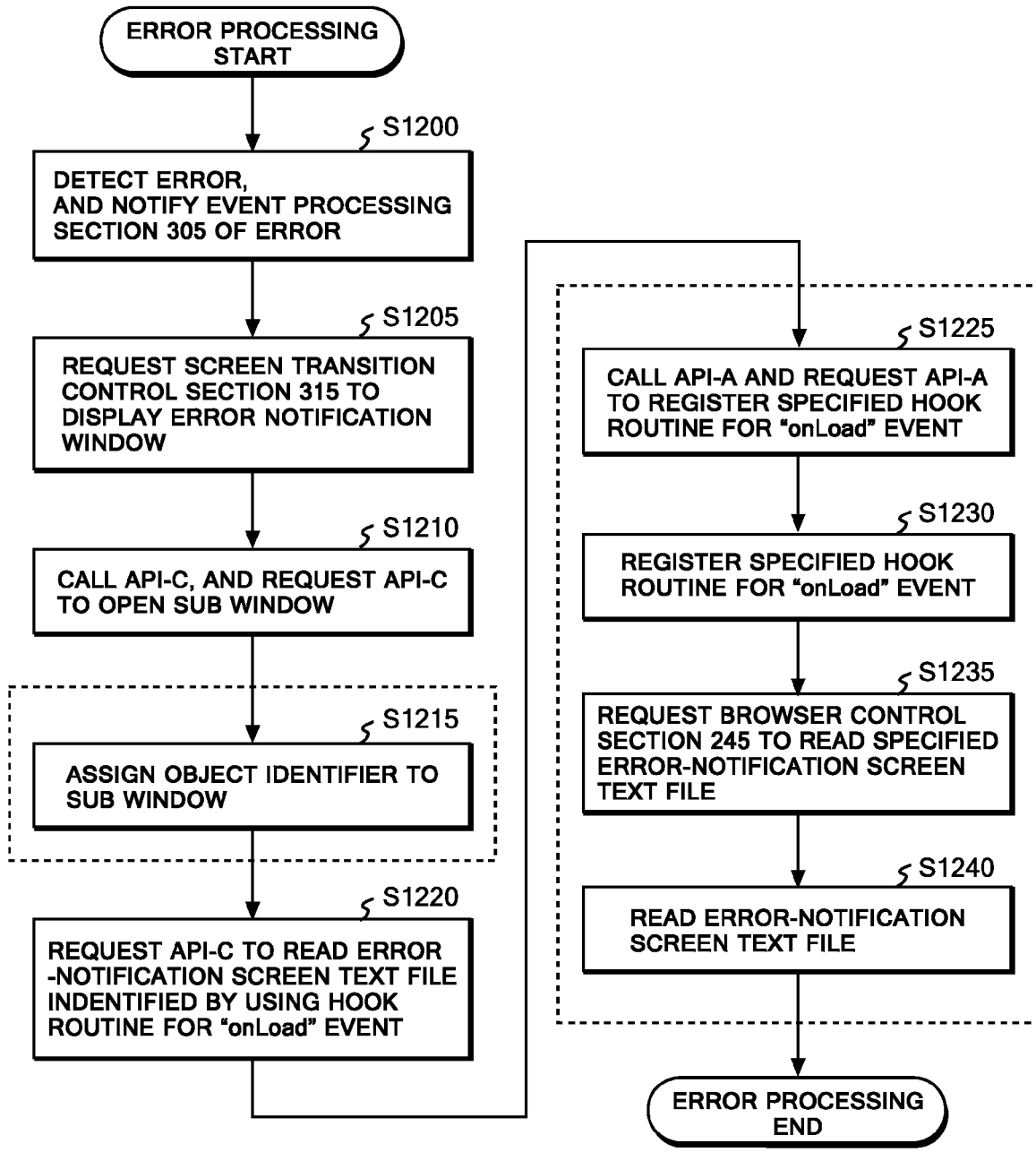
FIG. 14 shows one example of a flow of error processing.

FIG. 14 is a flowchart showing one example of a flow of event processing executed when the error has occurred. The processing is started from step 1200. Upon receiving notification of occurrence of the error from the middleware or device driver of the multifunction printer 100, the device information management section 310 delivers this notification to the event processing section 305. The event processing section 305 having received the notification of the occurrence of the error requests the screen transition control section 315 to display the error notification screen (step 1205).

The screen transition control section 315 calls the API-C 265 in response to the request from the event processing section 305, and requests the API-C 265 to open a sub window (step 1210). The called API-C 265 requests the browser control section 245 to open a new sub window, assigns an identifier to the opened sub window, and sends back this identifier to the screen transition control section 315 (step 1215).

Subsequently, the screen transition control section 315 calls the API-C 265 again by taking as arguments: the object identifier of the sub window, which is sent back from the API-C 265; a storage place of the error-notification screen text file in which a configuration of the error notification screen is written; and an address of a hook routine for an "onLoad" event, the hook routine called at the completion of reading of the error notification screen text file (step 1220).

The thus called API-C 265 further calls the API-A 250 by taking as arguments the received object identifier, "onLoad" event, and address of the hook routine, and requests the API-A 250 to register the event hooking routine for the "onLoad" event of the error notification screen text file in the sub window (step 1225). The API-A 250 registers, in the event management table as shown in FIG. 3, values received as the arguments from the API-C 265 (step 1230).

The API-C 265 specifies the object identifier of the sub window and the storage place of the error-notification screen text file, and requests the browser control section 245 to read the error notification screen text file (step 1235). For the sub window identified by the object identifier, the browser control section 245 reads the error notification screen text file by referring to the storage place, and controls the browser 200 so that the text file is displayed on the display unit 114 (step 1240). Then, the error occurrence event processing is terminated.

Figure 15:
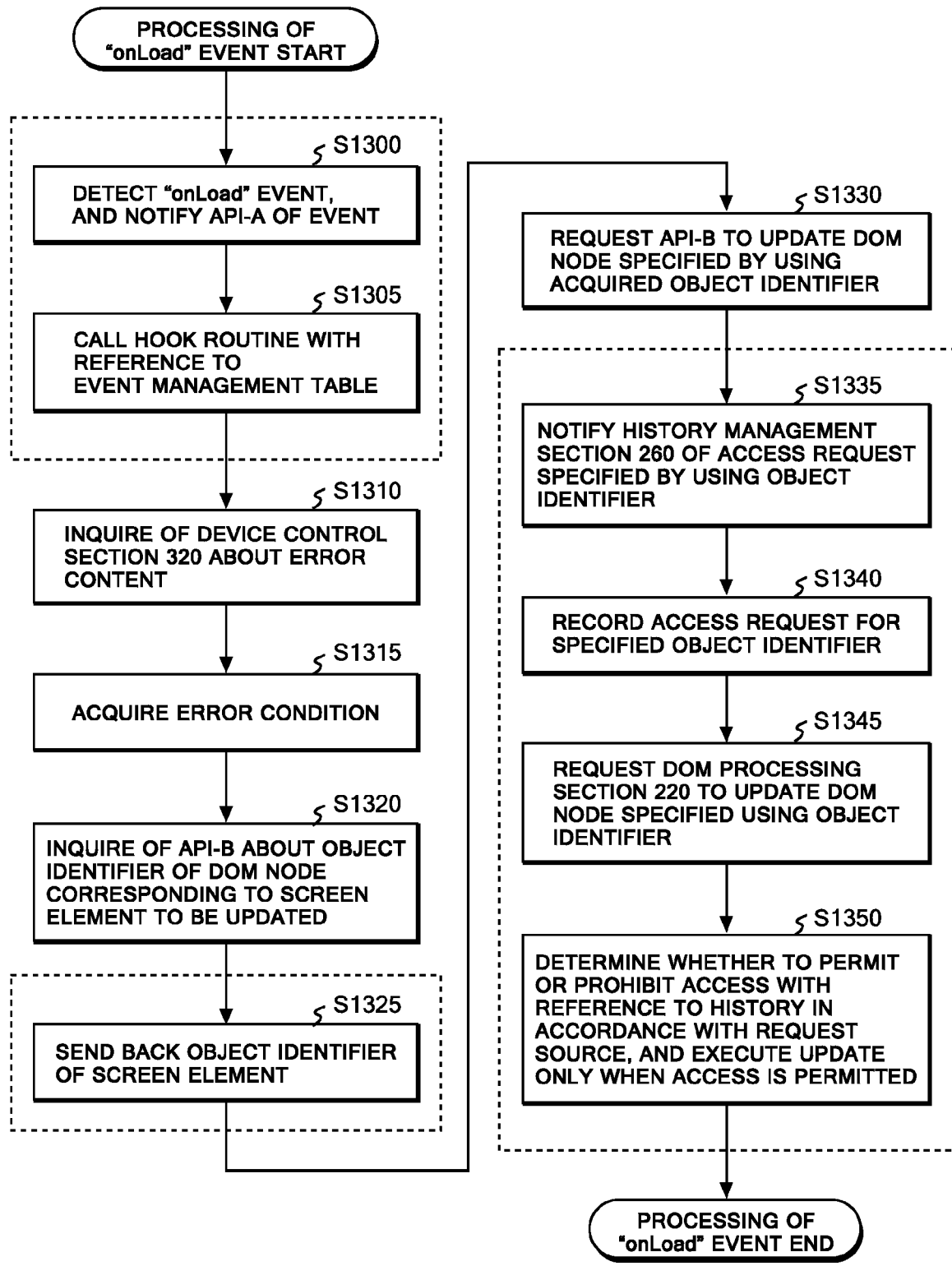
FIG. 15 shows another example of the processing flow of the "onLoad" event according to this embodiment.

FIG. 15 is a flowchart showing one example of flow of event processing executed when an "onLoad" event of the error notification screen text file has occurred. The error notification screen text file is a text file that displays the content of the error having occurred inside the multifunction printer 100, for example, as in the screen shown in FIG. 12, when being read into the browser 200.

The processing is started from step 1300. Upon detecting the event of reading the error-notification screen text file, the event notification section 235 notifies the API-A 250 of this event. The API-A 250 reads from the event management table an address of a hook routine corresponding to the event of reading the error-notification screen text file. Then, the API-A 250 calls, with reference to the address, the event processing section 305 that is to processes the event of reading the error-notification screen text file (step 1305).

The event processing section 305 having received the notification of the event of reading the error-notification screen text file inquires of the device information management section 310 about a content of the error having occurred inside the multifunction printer 100 (step 1310). The device information management section 310 having received the request from the event processing section 305 acquires, from the middleware or device driver of the multifunction printer 100, the content of the error having occurred inside the multifunction printer 100 (step 1315). The acquired content of the error is passed from the device information management section 310 to the access request section 320 in accordance to instruction from the event processing section 305.

In response to the request from the event processing section 305, the access request section 320 calls the API-B 255 by taking as an argument an ID (character string) of a screen element through which the content of the error is to be displayed in a screen displayed on the display unit 114. Then, the access request section 320 inquires of the API-B 255 about an object identifier of an object corresponding to the screen element (step 1320). The API-B 255 identifies the object corresponding to the screen element by calling getElementById by taking as an argument the thus received ID (character string) of the screen element, and then sends back the object identifier of the object to the access request section 320 (step 1325). Note that: the ID (character string) of the screen element, through which the content of the error is to be displayed, is included in the request from the event processing section 305; and the inquiry is made multiple times in a case where there are multiple IDs (character string) of the screen elements through which the contents of the error is to be displayed.

The above processing will be described with reference to FIG. 12 showing the error notification screen and FIG. 13 showing the DOM tree corresponding to the error notification screen in FIG. 12. In the error notification screen shown in FIG. 12, the cells 1200 and 1202 are screen elements through which the content of the error is displayed. Note that contents of the code and the measure are not written in the text file in which a screen configuration of the error notification screen shown in FIG. 12 is written. Here, suppose that inquiry has been made about an object identifier of the cell 1200 in which a character string for the error code is displayed. Then, the API-B 255 identifies a text node 1300 in the DOM tree shown in FIG. 13 as an object corresponding to the cell 1200, and then sends back an object identifier thereof.

With reference to FIG. 15 again, the access request section 320 calls the API-B 255 again by taking as arguments the acquired object identifiers and the error contents received from the device information management section 310, and requests the API-B 255 to update values of nodes in the DOM tree, the nodes being identified by the respective object identifiers (step 1330).

The API-B 255 requested to update the values notifies the history management section 260 that access to each of nodes in the DOM tree is requested by the state display control program 300, each node identified by the corresponding object identifier received as the argument (step 1335). The notified history management section 260 records, in the access history list retained therein, all of the object identifiers that the history management section 260 is notified of (step 1340).

Additionally, the API-B 255 requests the DOM processing section 220 to update the value of each of the nodes identified by the corresponding object identifier received as the argument (step 1345) with corresponding content of the error. As described above, the request is made repeatedly for the respective object identifiers. In each request, with respect to corresponding one of the objects identified from the corresponding object identifier, the API-B 255 calls setNodeValue by taking as an argument corresponding one of the received error contents.

The DOM processing section 220 having received the request determines whether to permit or to prohibit access with reference to the access management list maintained by the history management section 260 in accordance with a source of the request. Specifically, in a case where a source of the request for access is not the state display control program 300, the DOM processing section 220 refers to the access history list, and denies the access request if the request is for access to a node recorded in the access history list.

Here, since the access to a node in the DOM tree is requested via the API-B 255, the DOM processing section 220 determines that the source of the request is the state display control program 300. Then, the DOM processing section 220 allows the access without referring to the access history list, and executes a content of the access request. Consequently, a value of the node in the DOM tree, the node is identified by the object identifier, is updated with a corresponding content of the error (step 1350).

Here, description is made by taking as an example an "onLoad" event of the text file in which the screen configuration of the error notification screen shown in FIG. 12 is written. When the processing in step 1350 is executed, a character string "ER0001" and a text "Paper jam has occurred. Please remove . . . " are displayed in the respective cells 1200 and 1202 in FIG. 12 that have been initially blank. Then, the "onLoad" event processing is terminated.

Note that, although not being shown in the flowchart of FIG. 15, the event processing section 305 having received notification of the event of reading the error-notification screen text file in step 1310 performs the event-hooking processing for the target object in the error-notification screen as shown in FIG. 8 at appropriate timing, for example, after the processing in step 1350 and the like.

Note that, for the sake of avoiding repetition, operations of the browser 200 and the state display control program 300 in a case where the state information of the multifunction printer 100 which is requested to be displayed is a content of a status of a task currently processed by the embedded device will be omitted in this description. That is because the operations are basically the same as the above-described operations of the browser 200 and the state display control program 300 in the case where the state information of the multifunction printer 100 which is requested to be displayed is the error content.

Although the present invention has been described above on the basis of the embodiment, the technical scope of the present invention is not limited to the above embodiment. It is apparent to those skilled in the art that various modifications or improvements can be added to the above embodiment. For example, in the above described examples, the DOM processing section 220 denies access request from a request source other than the state display control program 300 for access to a DOM node, if the access request is one requesting access to a node listed in the access history list. Instead, the DOM processing section 220 may deny an access request from a request source other than the state display control program 300 for access to a DOM node, if the access request is one requesting access to a node which has been accessed in the past by the state display control program 300 to be updated.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," and "subsequently," for the sake of convenience, this does not necessarily mean that the operational flow has to be executed by an order indicated by these expressions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for displaying a state of an embedded device using a browser, the embedded device and the browser operable by at least one processor in a computing environment, the method comprising:
   requesting the browser to display a text file having a description of a screen structure in response to a request to display state information;
   acquiring the state information on a current state of the embedded device in response to reading the text file by the browser;
   submitting, by a state display control program, an access request for requesting the browser to update, with the acquired state information, a value of at least one node in a document object model (DOM) tree generated from the text file by the browser;
   displaying the text file on a screen of the embedded device in response to the request to display state information;
   recording the at least one node in an access history list in response to the request to update the value of the at least one node, the access history list including at least one of an object identifier of the at least one node and contents of the access request; and
   at a subsequent time, determining whether to permit a subsequent access request for the at least one node based on a source of the subsequent access request;
   wherein:
   if the source of the subsequent access request is not the state display control program, and the at least one node is recorded in the access history list, the subsequent access request is denied, and
   if the source of the subsequent access request is the state display control program, the subsequent request is granted without referring to the access history list.

2. The method of claim 1, wherein:
   the request to display the state information is a request to display a setting content currently set in the embedded device, and
   the display of the text file on a screen of the embedded device includes displaying a settings screen text file having a description of a screen configuration for one of checking and changing the setting content.

3. The method of claim 1, further including receiving, by the browser, an event of operation performed on the text file displayed on the screen.

4. The method of claim 1, wherein:
   the text file having the description of the screen structure is an error-notification screen text file having a description of a screen configuration for displaying error content, and
   the request to display the state information includes requesting to display an error content based on error occurrence notification of an error having occurred in the embedded device.

5. The method of claim 4, wherein the requesting to display the error content is received from one of middleware and a device driver of the embedded device.

6. The method of claim 4, wherein the requesting to display the error content is performed in response to a transfer of the error occurrence notification.

7. The method of claim 1, wherein:
the request to display the state information is a request to display a status based on status notification of a processing status of a task currently processed by the embedded device, and
the text file having the description of the screen structure is a status-display screen text file having a description of a screen configuration for displaying the status of the task written therein.

8. The method of claim 1, further including:
informing the browser of a hook routine for the reading of the text file, and
registering in a table the hook routine in association with the reading of the text file to determine a destination of notification of a received event.

9. The method of claim 1, further including:
on a condition that a change in a setting content currently set in the embedded device is requested, requesting the browser to refer to the value of the at least one node, and
changing the setting content currently set in the embedded device corresponding to the at least one node to the value of the at least one node.

10. The method of claim 1, wherein displaying the text file on a screen of the embedded device in response to the request to display state information includes displaying the text file on a screen of a computer peripheral device, a personal computing device, a tablet device, a digital home appliance, and a mobile telephony device.

\* \* \* \* \*